(12) United States Patent
Henneberger et al.

(10) Patent No.: US 10,965,241 B2
(45) Date of Patent: Mar. 30, 2021

(54) SOLAR PLANT SUPPORT STRUCTURE

(71) Applicant: Tien Solar LLC, Austin, TX (US)

(72) Inventors: Bernard Erwin Henneberger, Austin, TX (US); Thomas G. Tien, Cardiff, CA (US)

(*) Notice: Subject to any disclaimer, the term of this patent is extended or adjusted under 35 U.S.C. 154(b) by 572 days.

(21) Appl. No.: 13/958,851

(22) Filed: Aug. 5, 2013

(65) Prior Publication Data

US 2018/0337626 A1  Nov. 22, 2018

Related U.S. Application Data (63) Continuation-in-part of application No. 13/760,007, filed on Feb. 5, 2013, now abandoned.

(60) Provisional application No. 61/595,077, filed on Feb. 5, 2012.

(51) Int. Cl.
  *H02S 20/10* (2014.01)
  *F24S 25/12* (2018.01)

(52) U.S. Cl.
  CPC .............. *H02S 20/10* (2014.12); *F24S 25/12* (2018.05)

(58) Field of Classification Search
  CPC .......... A01G 9/243; H02S 20/10; F24S 25/12; G01S 3/786
  USPC ......... 250/203.4; 248/440.1; 52/649.2–649.4
  See application file for complete search history.

(56) References Cited

U.S. PATENT DOCUMENTS

| | | | | |
|---|---|---|---|---|
| 4,184,476 A | * | 1/1980 | McArthur | F24S 20/67 |
| | | | | 126/632 |
| 5,542,639 A | * | 8/1996 | Wixey | B23D 47/025 |
| | | | | 108/117 |
| 6,766,623 B1 | * | 7/2004 | Kalnay | E04B 1/34305 |
| | | | | 135/128 |

(Continued)

FOREIGN PATENT DOCUMENTS

| | | | |
|---|---|---|---|
| DE | 102007001827 A1 | * 7/2008 | ............... E04B 7/14 |
| JP | 11168228 A | * 6/1999 | |

(Continued)

OTHER PUBLICATIONS

Kim, Eugene. "Modern Architecture—Singapore's Super-Tall Solar Trees." Modern Architecture, attached, Dec. 21, 2009. (Year: 2009).*

(Continued)

*Primary Examiner* — Magdalena Topolski
*Assistant Examiner* — Morgan T Barlow (57) ABSTRACT

A new type of structure for mounting solar modules addresses the problem of solar access in several ways. Firstly, the structure can enclose a living plant and protect it and equipment. This allows improved acceptance and can provide a means for ground mounted solar to be classified as landscape by permitting authorities. This can make a large difference in the amount of area a land owner can use to mount solar modules. Also, the structure can make better use of recently developed solar technology like AC modules, microinverters and optimizers by allowing a solar designer to predefine a non-planar insolation surface that can be implemented using locally made materials. By allowing a custom non-planar design the solar plant support structure can more closely match loads, lower energy storage costs, energy transmission costs and make better use of limited solar access.

15 Claims, 11 Drawing Sheets

(56) References Cited

U.S. PATENT DOCUMENTS

| | | | | |
|---|---|---|---|---|
| 7,531,741 | B1* | 5/2009 | Melton | H02S 20/32 |
| | | | | 136/246 |
| 7,694,486 | B2* | 4/2010 | Murphy | B64G 1/222 |
| | | | | 52/645 |
| 8,381,454 | B1* | 2/2013 | Robinson | A01K 1/00 |
| | | | | 135/159 |
| 8,648,551 | B2* | 2/2014 | Noble | F24S 30/452 |
| | | | | 318/8 |
| 8,684,190 | B2* | 4/2014 | Abar | H02S 20/30 |
| | | | | 211/41.1 |
| 8,746,233 | B2* | 6/2014 | Gonzalez Moreno | |
| | | | | F24S 30/452 |
| | | | | 126/600 |
| 8,939,143 | B2* | 1/2015 | Zuritis | H02S 20/10 |
| | | | | 126/569 |
| 2005/0045224 | A1* | 3/2005 | Lyden | H02J 7/355 |
| | | | | 136/252 |
| 2006/0011194 | A1* | 1/2006 | Hensley | H01L 31/02008 |
| | | | | 126/655 |
| 2008/0148631 | A1* | 6/2008 | Wan | A01G 13/0206 |
| | | | | 47/22.1 |
| 2008/0230047 | A1* | 9/2008 | Shugar | H02S 20/00 |
| | | | | 126/569 |
| 2009/0229200 | A1* | 9/2009 | Noble | E04H 12/2261 |
| | | | | 52/169.13 |
| 2009/0265986 | A1* | 10/2009 | Young | A01G 31/02 |
| | | | | 47/62 R |
| 2010/0102202 | A1* | 4/2010 | Sherman | H01L 31/052 |
| | | | | 250/203.4 |
| 2010/0146877 | A1* | 6/2010 | Brandt | E02D 27/32 |
| | | | | 52/173.3 |
| 2010/0218441 | A1* | 9/2010 | Stancel | H02S 20/30 |
| | | | | 52/173.3 |
| 2010/0220467 | A1* | 9/2010 | Daidone | F21S 9/026 |
| | | | | 362/183 |
| 2010/0269428 | A1* | 10/2010 | Stancel | H02S 20/23 |
| | | | | 52/173.3 |
| 2010/0282943 | A1* | 11/2010 | Boyk | F24S 30/455 |
| | | | | 250/203.4 |
| 2010/0294337 | A1* | 11/2010 | Sherman | G01S 3/7861 |
| | | | | 136/246 |
| 2011/0067324 | A1* | 3/2011 | French, Sr. | E02D 27/01 |
| | | | | 52/167.1 |
| 2011/0072740 | A1* | 3/2011 | Dieter | E04C 3/34 |
| | | | | 52/173.3 |
| 2011/0094559 | A1* | 4/2011 | Potter | H02S 20/10 |
| | | | | 136/244 |
| 2011/0113683 | A1* | 5/2011 | Morgan | A01G 13/0206 |
| | | | | 47/22.1 |
| 2011/0113684 | A1* | 5/2011 | Morgan | A01G 9/122 |
| | | | | 47/31 |
| 2011/0114080 | A1* | 5/2011 | Childers | F03G 7/06 |
| | | | | 126/601 |
| 2011/0139145 | A1* | 6/2011 | Mackamul | H02S 20/32 |
| | | | | 126/600 |
| 2011/0271608 | A1* | 11/2011 | Egan | E04H 12/10 |
| | | | | 52/122.1 |
| 2012/0074079 | A1* | 3/2012 | Marley | F24S 25/70 |
| | | | | 211/41.1 |
| 2012/0181973 | A1* | 7/2012 | Lyden | H02J 3/383 |
| | | | | 320/101 |
| 2012/0187276 | A1* | 7/2012 | Orsello | F24S 25/70 |
| | | | | 250/203.4 |
| 2012/0204925 | A1* | 8/2012 | Lyden | H01L 31/042 |
| | | | | 136/244 |
| 2012/0294788 | A1* | 11/2012 | Walsh, Jr. | A01G 9/243 |
| | | | | 423/225 |
| 2012/0312958 | A1* | 12/2012 | Blumenthal | G02B 7/183 |
| | | | | 250/203.4 |
| 2013/0118550 | A1* | 5/2013 | Sahin | H01L 31/042 |
| | | | | 136/246 |
| 2013/0127395 | A1* | 5/2013 | Santos Silva Serra Duarte | |
| | | | | B60L 53/11 |
| | | | | 320/101 |
| 2013/0174889 | A1* | 7/2013 | Dalland | H02S 30/10 |
| | | | | 136/245 |
| 2013/0318894 | A1* | 12/2013 | Khowaiter | H02S 20/24 |
| | | | | 52/173.3 |
| 2013/0319501 | A1* | 12/2013 | Hilliard | F24S 23/74 |
| | | | | 136/246 |
| 2014/0182663 | A1* | 7/2014 | Kuo | H02S 30/10 |
| | | | | 136/251 |
| 2014/0196387 | A1* | 7/2014 | Neito | E04H 6/025 |
| | | | | 52/173.3 |
| 2015/0077979 | A1* | 3/2015 | Namors | E01F 15/08 |
| | | | | 362/153.1 |
| 2015/0122333 | A1* | 5/2015 | Kitano | H02S 20/20 |
| | | | | 136/259 |
| 2015/0176280 | A1* | 6/2015 | Brothersen | H02S 20/30 |
| | | | | 52/173.3 |
| 2015/0236637 | A1* | 8/2015 | Sade | H02S 20/10 |
| | | | | 136/246 |
| 2015/0256120 | A1* | 9/2015 | Anderson | H02S 20/10 |
| | | | | 136/251 |
| 2016/0073591 | A1* | 3/2016 | Surany | F24S 90/00 |
| | | | | 47/32.3 |
| 2016/0146921 | A1* | 5/2016 | Jeong | G01S 3/7861 |
| | | | | 250/203.4 |
| 2016/0204731 | A1* | 7/2016 | Al-Haddad | F24S 25/617 |
| | | | | 211/182 |
| 2017/0237391 | A1* | 8/2017 | Michotte De Welle | |
| | | | | F16M 11/10 |
| | | | | 248/372.1 |

FOREIGN PATENT DOCUMENTS

| | | | | |
|---|---|---|---|---|
| WO | WO-2008083219 | A2* | 7/2008 | F03D 9/007 |
| WO | WO-2012090191 | A1* | 7/2012 | H02S 20/00 |
| WO | WO-2013024369 | A1* | 2/2013 | H01L 31/042 |

OTHER PUBLICATIONS

Unknown author. "Emerging Trends in Green Roof Practices—Integration with Solar Panels." Centre for Urban Greenery and Ecology, attached, Nov. 22, 2010. (Year: 2010).*

Unknown author. "Gardens by the Bay—Supertrees." National Parks, attached, Jun. 29, 2011. (Year: 2011).*

Said-Moorhouse, Lauren. "Solar-powered 'supertrees' breathe life into Singapore's urban oasis." CNN, attached, Jun. 8, 2012. (Year: 2012).*

* cited by examiner

FIG. 10A
SIDE VIEW 15 DEG TOP BEND

FIG. 10D
SIDE VIEW 5 DEG TOP BEND

FIG. 10B
SIDE VIEW 0 DEG TOP BEND

FIG. 10E
SIDE VIEW -5 DEG TOP BEND

FIG. 10C
SIDE VIEW 10 DEG TOP BEND

SOLAR PLANT SUPPORT STRUCTURE

CROSS-REFERENCE TO RELATED APPLICATIONS

This application claims priority under 35 USC 120 to and is a continuation in part of U.S. patent application Ser. No. 13/760,007, filed on Feb. 5, 2013, entitled "Solar Plant Support Structure" by the present inventors and Wan Young. This application claims the benefit of provisional patent application Ser. No. 61/595,077, filed Feb. 5, 2012, by the present inventors and Wan Young.

BACKGROUND

The present invention generally relates to the field of solar energy. More specifically, it relates to solar access, solar module mounting support and equipment protection. The invention also has secondary purposes that relate to fields associated with vegetative plant protection and support, shade providing structures and seating.

There are many options and methods for the mounting of solar modules yet the adoption of solar energy is still limited by many factors. These include electrical, geographical, economic, environmental, temporal as well as aesthetic limitations all of which could affect usefulness and adoption of solar energy equipment over conventional energy sources.

For photovoltaic modules specifically, when using a traditional string inverter it is a commonly accepted design practice to arrange solar modules within a plane or at the same azimuth and elevation angle since this optimizes the energy output. However, the proliferation of several technologies enables non-planar arrangement of a plurality of modules without a reduction in output associated with the electrical components of the solar equipment. This technology includes AC modules, DC modules with microinverters and also module level optimizers used with traditional string inverters. Most available solar support structure products are designed to meet the needs of traditional design practice and are limited in providing the design flexibility that microinverters, optimizers or AC modules allow.

The arrangement of solar modules particularly photovoltaic modules is also complicated by self shading. While humans may not be averse to shade in full sun, a small amount of shading or self shading of an array of solar modules can drastically reduce the output of modules or a series string of modules. A common traditional design is to mount strings of modules on planar frames at a specified azimuth and elevation that are arranged in rows and/or columns. Most mounting and or support products can be designed to support this arrangement. Unfortunately this leads to a classic design trade-off problem in using these products where the row spacing should be carefully selected to minimize shading that is caused by another row or column. There are currently limited available products or structural methods which can allow modules to be designed and arranged on a non-planar but continuous surface that can help minimize this self shading and make better use of microinverters, AC modules and optimizers. Implementing non-planar modules or modules with diversified azimuth angles has an additional advantage of possibly providing an energy production curve that more closely follows energy load. Energy load can vary throughout the day and year. By matching energy production to load, energy storage costs and/or transmission costs are minimized. This optimization can be done using existing technology but not without even greater challenges.

Solar module (Photovoltaic or other) height is also an important consideration in maximizing insolation and output. Adoption of solar energy often requires that sufficient insolation be available to the modules for years to come. Available locations are often affected by changing conditions such as the construction of new buildings or the growth of trees or other obstructions that are beyond the solar equipment owner or solar equipment operator's control. Positioning modules at sufficient height can often make a project more economically viability by increasing insolation over the life of the solar equipment. Height requirements further limit the range of products or structural methods that can address the above limitations.

While aesthetics do not directly affect utility, it is sometimes a key consideration in the adoption of solar. Often the economic viability of a solar equipment implementation is dependent on location. Specifically, if the solar equipment can be located near the end user an economic advantage is often achieved. Many end users can participate in net metering by an agreement with their energy provider or can store energy locally that can allow the end user to avoid cost at a retail energy rate. Additionally, some of an energy provider's transmission costs are avoided and the development of additional electrical distribution infrastructure can also be avoided. As an illustrative example of aesthetics playing an indirect role in utility let us consider a solar array for a residential property that is governed by a neighborhood association. A neighborhood association may be unlikely to approve a ground mount that occupies a large portion of a property owner's yard; however, it may be more inclined to approve a structure that integrates a plant that has inherent desirable aesthetic qualities or a structure that can provide additional value with shaded seating and integrated protection. Protection of solar equipment often requires a fence to protect sensitive and potentially dangerous equipment from animals or the general public. Also, many currently available options often sacrifice a large area of property to accommodate only the solar energy equipment and do not provide integrated shaded seating or the inherent aesthetics of a plant. By placing the solar energy equipment close to the end user as stated, transmission costs are avoided and the owner or operator may avoid some retail energy costs.

A variety of plant protection and support structures ranging from green houses and fences to trellises exist; however these are rarely designed to be integrated with a solar module support structure.

Shading and seating is obviously available but very often not specifically integrateable with solar energy equipment. Solar car parks and trees exist but are often limited by the arrangement of modules in a way that allows very little light to penetrate and are typically limited to the arrangement of modules in a single plane.

Finally, the durability of the support is also a major concern. For example, a designer may use a roof mounting solution on a roof that will only last a fraction of the expected lifetime of the solar components.

These and other limitations often present challenges for which few existing mounting solutions are ideal. Even fewer are readily integrated with the secondary purposes of the invention.

SUMMARY

The embodiments include a solar module mounting structure that serves to hold solar modules for a duration of time in planar or non-planar orientations that additionally allow a plant to grow within the interior of the mounting structure. The structure is constructed using bent, conventional rebars, suitable metal and/or suitable metal tubing or other material that supports the solar modules along a surface while also protecting an interior plant and components. Solar modules of any type may be mounted to the surface of this structure. The structure may be placed or secured on a foundation that can additionally serve as seating with the top of the structure and modules serving as shade elements. Additionally a planter ring may be integrated.

In accordance with one or more embodiments, a solar plant support structure is comprised of seven or more vertical support elements made from long narrow suitably rigid material shaped to provide a predetermined height and support for solar modules mounted along a predetermined insolation surface 4, a plurality of horizontal support elements selected from the group consisting of hoops, helixes spirals and arcs and a means for interconnecting said vertical support elements to horizontal support elements at distributed intervals along a closed area with spacing and strength sufficient to provide mechanical support and structural stability.

DRAWINGS—REFERENCE NUMERALS

1 Vertical Support element
2 Horizontal Support element
12 Combiner box
14 Predefined planar or nonplanar insolation surface
16 Solar Mounting hardware
18 Solar Modules
19 Interior Solar Module
20 Electrical Conduit
22 Foundation
23 Stirrups
24 Foundation rings
25 First level
26 Securing device

DETAILED DESCRIPTION OF THE EMBODIMENTS

For the purposes of this description, let us define an insolation surface locally as a continuous limited surface (e.g. S(x,y,z)) that has an upper portion on which solar energy impinges. This insolation surface can be predefined by a designer who wishes to implement or construct support on which solar modules can be mounted approximating the surface of this insolation surface.

Embodiments of the invention further strive to solve the problem of solar access by providing a means for the solar support structure to be officially permitted as landscape by permitting authorities. Embodiments may incorporate interior vegetative plant(s) or a planter ring for this purpose. In at least one case an embodiment of the invention was approved for a permit for future construction outside setback boundaries where normally only landscaping would be permitted thereby allowing the embodiment to be constructed on a less shaded portion of the property.

Additionally embodiments of the invention strive to solve the problem of solar access through increased acceptance. This acceptance is improved through the addition of functionality. With minimal additional space embodiments may provide seating or shade that may reduce heat islanding effects or shaded seating that if provided by other means would normally not generate usable energy.

Furthermore embodiments of the invention strive to solve the problem of solar access through additional means. Many environments are not suitable for solar or landscape installations because a fence is required to protect equipment or vegetation from animals or the general public; or animals or the general public from potential voltage hazards. Embodiments of the invention can make efficient use of the encircling vertical support elements 1 and horizontal support elements 2 to protect interior equipment, vegetation or both from outside disturbance reducing the need for a fence and the associated additional space required.

In embodiments of the invention, the solar insolation surface 14 is used as a design constraint that defines the bends, positions and orientations of vertical support elements 1 which are stabilized or held in position by horizontal support elements 2. Embodiments of the invention comprising these two elements with their interconnections provides stable support for mounting a plurality of solar modules 18 along the predetermined solar insolation surface 14.

Figure 1:
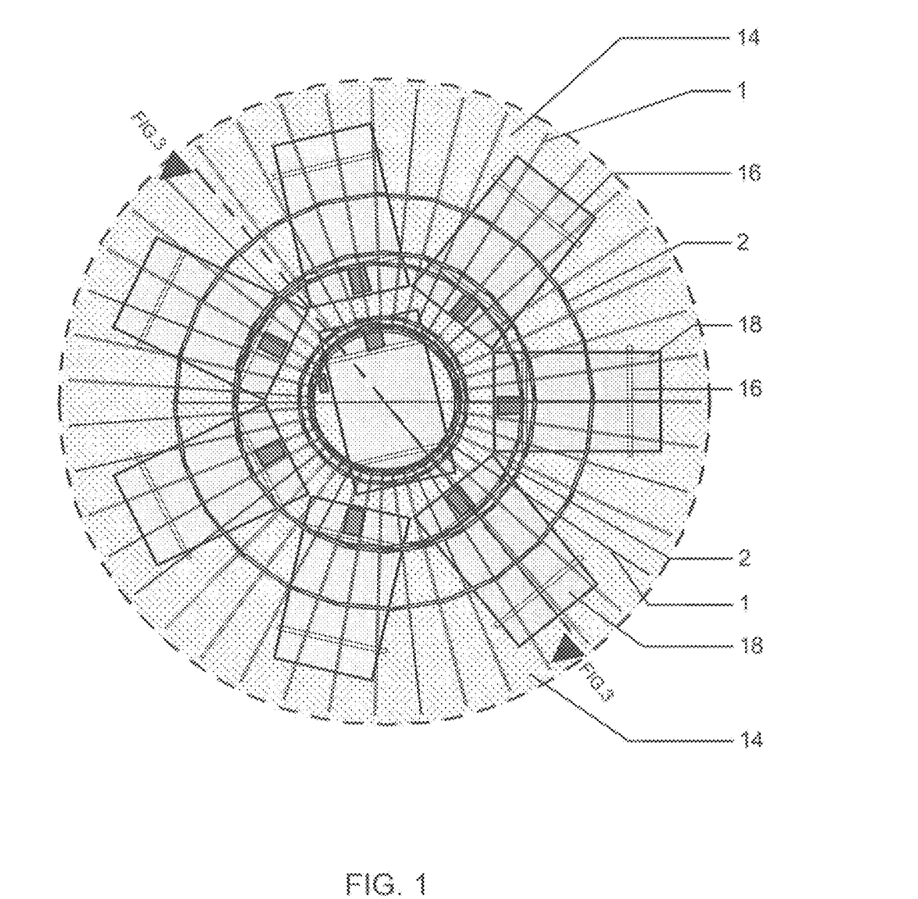
FIG. 1 is a top view of an embodiment of the present invention.
Figure 2:
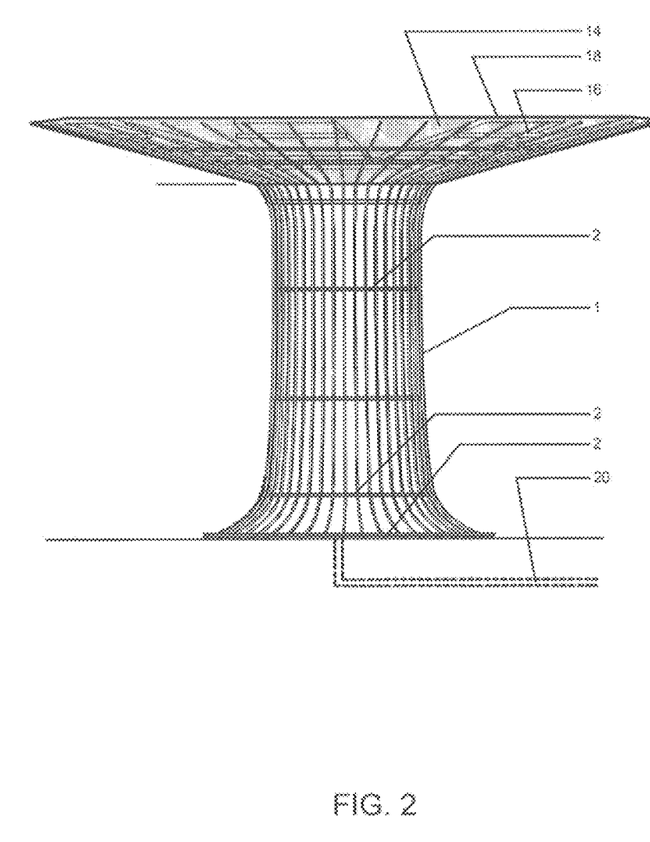
FIG. 2 is a side view of an embodiment of the present invention.

An embodiment depicted in FIG. 1 and FIG. 2 shows vertical support elements 1 that are arranged to form a protective trunk like region by which a multitude encircle a sufficiently large void region. The bends on the bottom portion of the vertical support elements 1 are bent to provide more stable support. Horizontal support elements 2 are shown here as hoops but are generally in the form of either hoops, elliptical rings, helixes, arcs or cables. These horizontal support elements 2 together with the vertical support elements 1 are bent or formed to conform to the predetermined planar or non-planar insolation surface 14 and provide stable support for solar modules 18 at no less than three points approximately on the predefined insolation surface per mounted solar module 18 thereby providing a height and an orientation approximately defined by the predefined insolation surface. Since solar modules are not necessarily flexible and have a finite size they each may only conform or intersect to a continuous surface at one point.

In general, the solar insolation surface 14 occupies a defined area; note the circular shape of 14 in the embodiment of FIG. 1. Other embodiments may define an area that is approximately oval, rectangular or any 2 dimensional shape other shape when viewed from the top.

Note, in general, if the void region is too large to support the intended solar modules the designer may predefine this area with a hole. This can be done to ensure that an interior plant or equipment receives light.

In the embodiment of FIGS. 1 and 2, the vertical support members are bent identically and positioned so that the top portion points radially outward. This conforms to an insolation surface 14 that looks like a wide cone. Embodiments such as this may provide a more even power distribution throughout the day and year than a conventional planar implementation for equatorial regions (e.g. Africa) thereby providing an advantage over existing solutions by, for example, requiring less costly energy storage. Embodiments such as these also provide an arrangement of the solar panels such that any run-off may help irrigate the interior plant.

Figure 7:
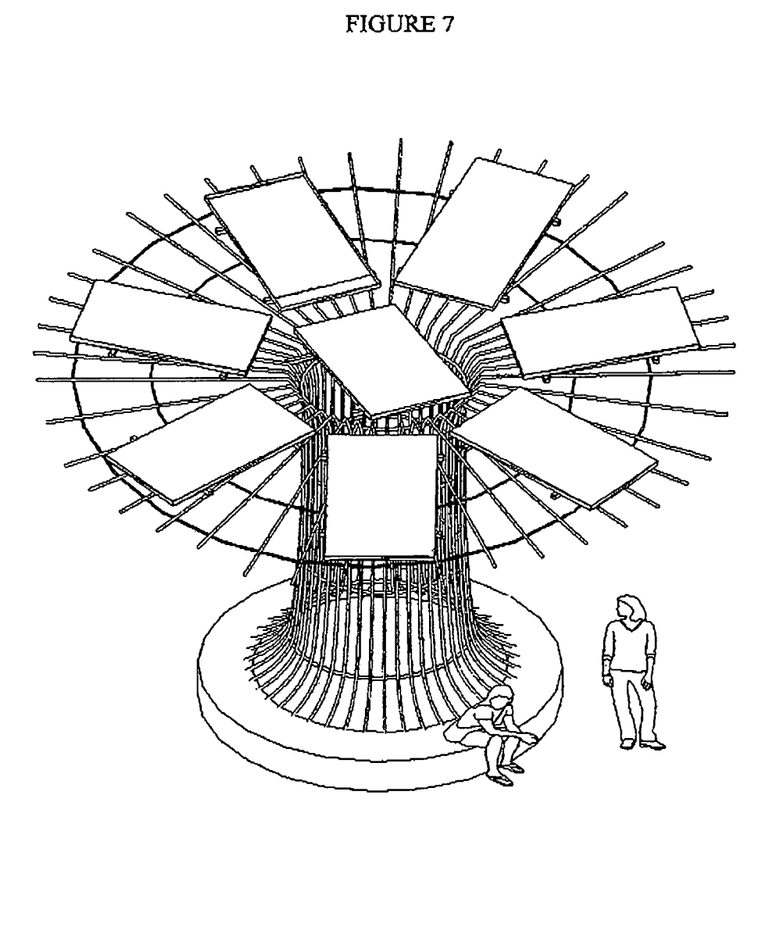
FIG. 7 is a perspective view of an embodiment of an invention with interior protected plant.

The void interior region may contain components such as a solar circuit junction/combiner box 12 (FIG. 1) and conduit 20 (FIG. 2) that continues outside the embodiment of the invention connecting modules to an external load or grid through established National Electric Code (NEC) or equivalent compliant means or to another type of energy utility or energy storage system. The void region may also contain and/or support an optional interior plant or plants as depicted in the embodiment of FIG. 7. Additionally it may contain conventional plumbing, watering equipment or means for water storage. Furthermore it may contain or partially contain a planter ring containing soil or potting material, growing medium, stones, geotextiles, linings, water reclaiming means, recycled materials, etc.

Embodiments may specify a planter ring and/or a means for seating as depicted in FIG. 7 or as may be implemented in other embodiments. These can be constructed on top of a foundation or integrated with a foundation. A foundation and a means of securing embodiments to the foundation may be needed and is recommended to provide a safe permanent structure.

Referring to the embodiments in more detail, the vertical support elements are welded or connected by appropriately strong connections or ties at all intersections or contact points with the horizontal support elements needed to provide stability.

Figure 8:
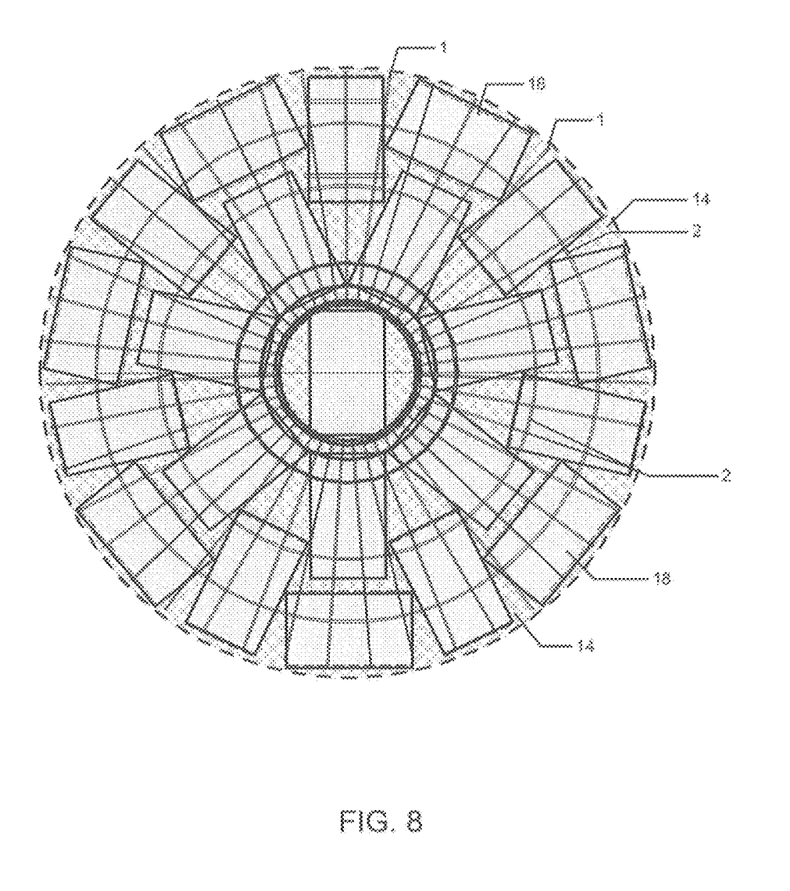
FIG. 8 is a top view of a embodiment of the present invention.
Figure 9:
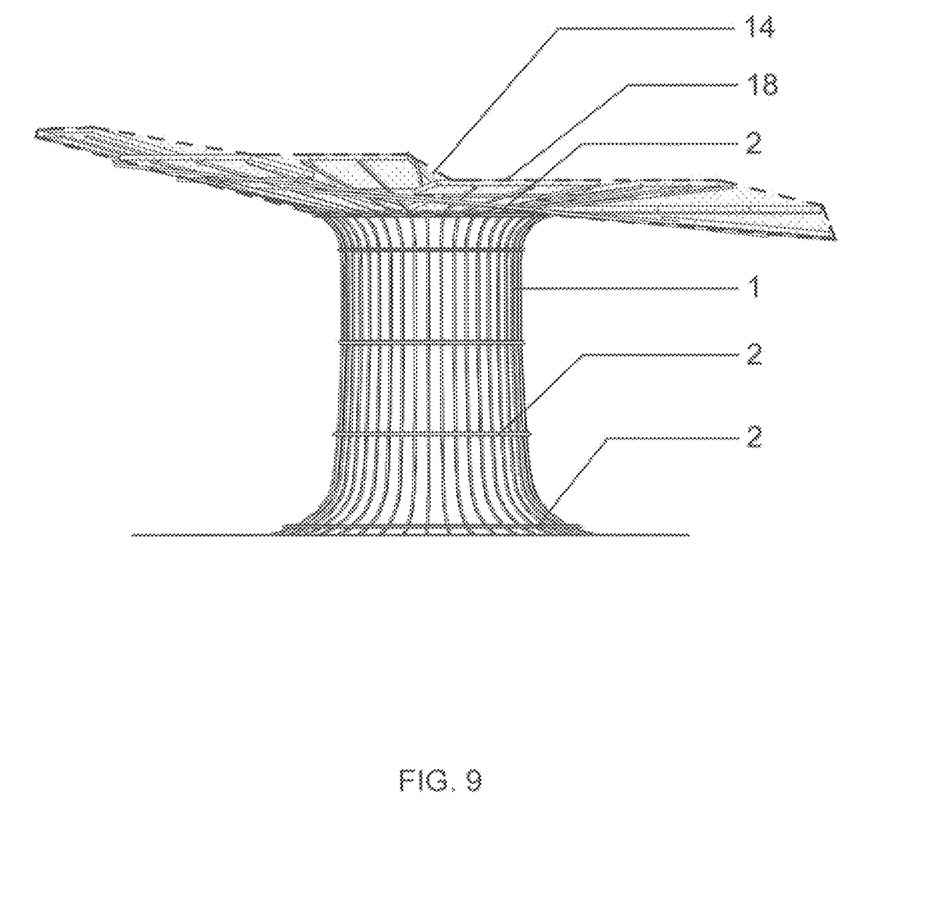
FIG. 9 is a side view of an embodiment of the present invention.
Figure 10A:
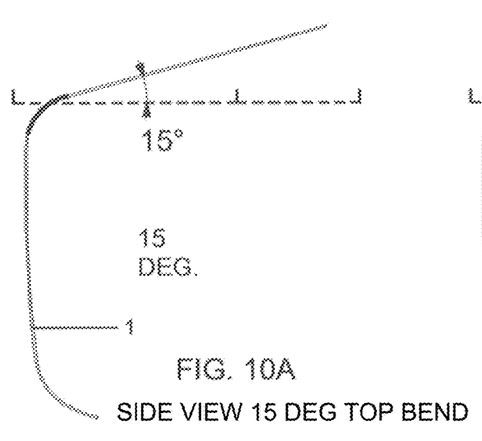
FIGS. 10A-E show side views of vertical support elements with different top bend angles representative of the shapes used in an embodiment such as the embodiment shown in FIGS. 8 and 9.
Figure 10B:
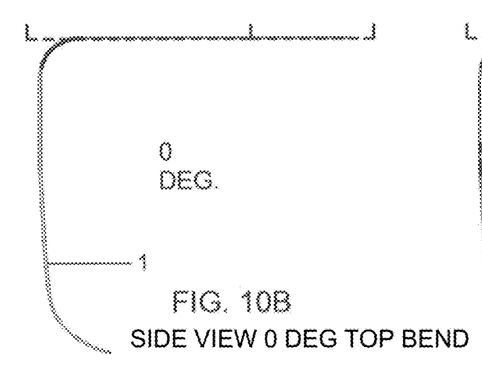
Figures 10C, 11:
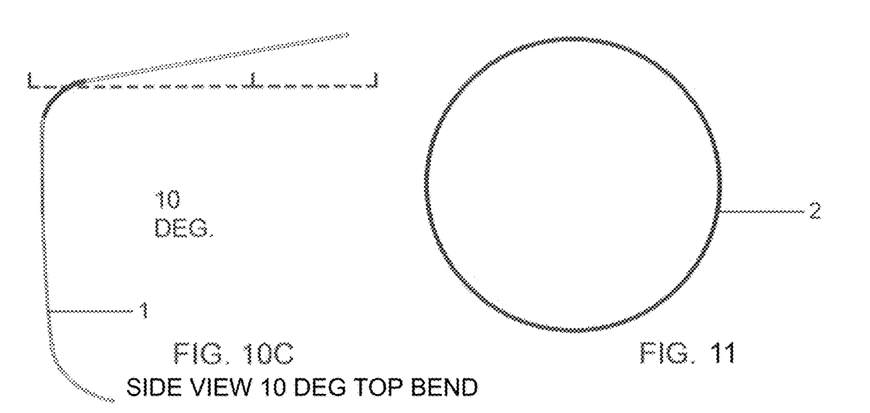
FIG. 11 shows horizontal support elements representative of the shapes used in an embodiment such as the embodiment shown in FIGS. 8 and 9.
Figure 10D:
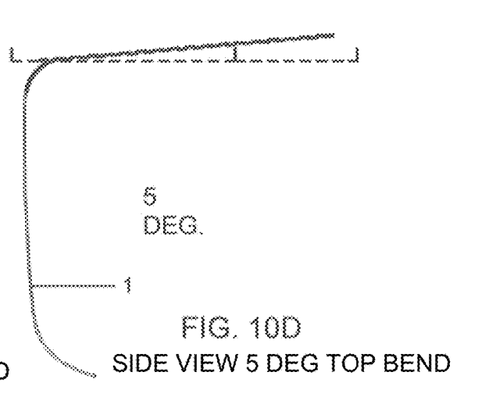
Figure 10E:
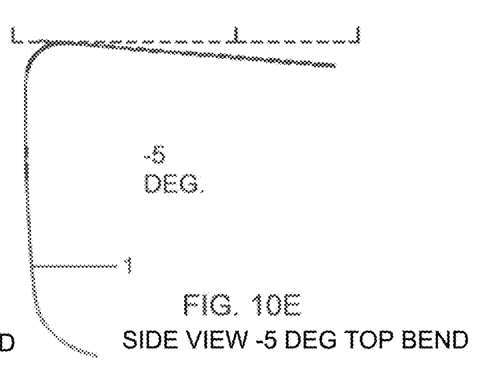
Figure 12:
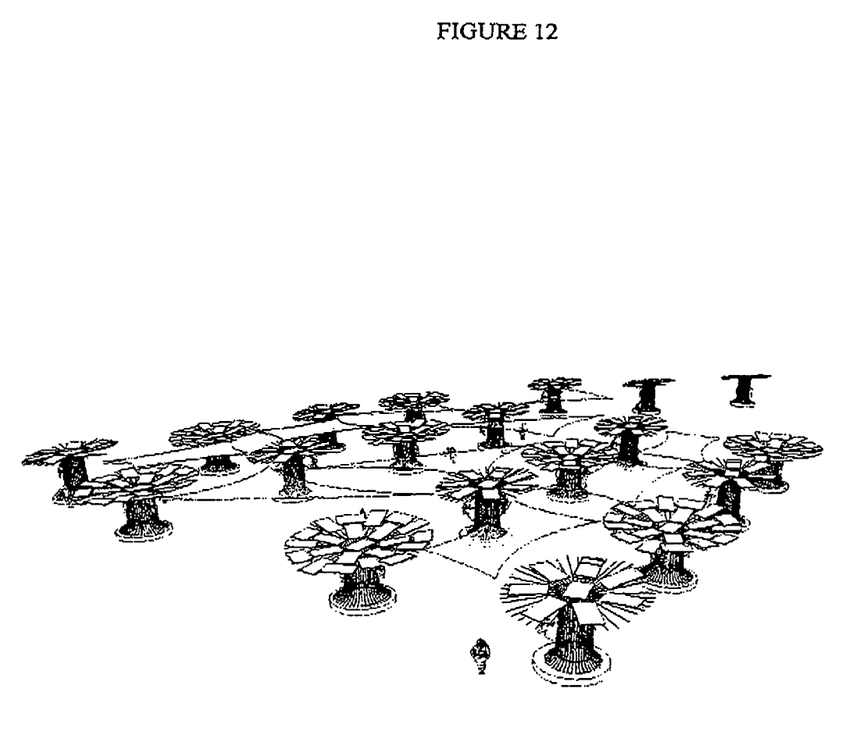
FIG. 12 Embodiments in a computer modeled park or solar orchard setting, wherein a solar orchard is an arrangement allowing fruit trees to be protected.

The vertical support elements need not be bent identically as previously shown and the arrangement of the solar modules may be any. These are shown in a new embodiment depicted in FIGS. 8, 9 and 10. FIG. 8 (top view) shows the top view of a 22 module embodiment arranged in a radial distribution approximately in a solar insolation plane 14. FIG. 10 shows the representative and approximate shape of the vertical support elements that conform approximately to the predetermined solar insolation surface 18. FIGS. 10A, 10B, 10C, 10D, 10E show vertical support elements 1 with two bends. The first bend for the bottom of the vertical support element is identical for each vertical support element while the top bends vary in 5 degree increments from +15 degrees to −5 degrees for the different vertical support elements such that the solar modules can be approximately supported along the predetermined solar insolation surface. In this embodiment, the solar isolation surface is unsymmetrical. This can clearly be seen on FIG. 9 (side view). FIG. 11 shows the representative and approximate shape of the horizontal support elements.

The vertical support elements and/or the horizontal support elements are made from steel Rebar or equivalent structural elements such as wrought iron, metal tubing or steel strapping material and are each sized and specified to support live loads, wind pressure and seismic force. These elements can be epoxy coated, galvanized, nickel plated, stainless steel or bare steel to suit both environment and aesthetic requirements. Alternate materials may also be used given they have sufficient strength to support the loads and forces for a duration.

Figure 3:
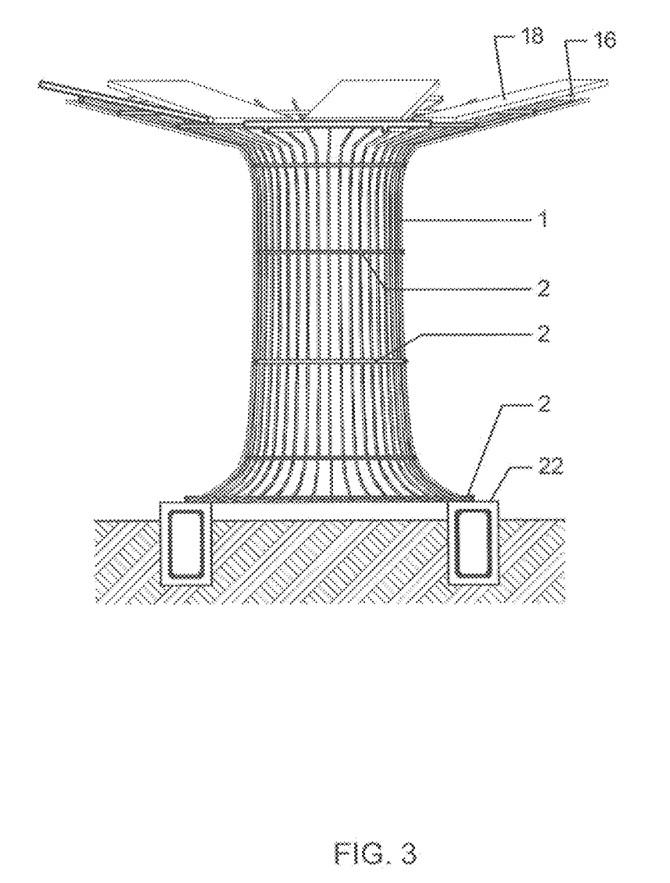
FIG. 3 is a side view of an embodiment of the present invention with a cross section of a foundation.
Figure 4:
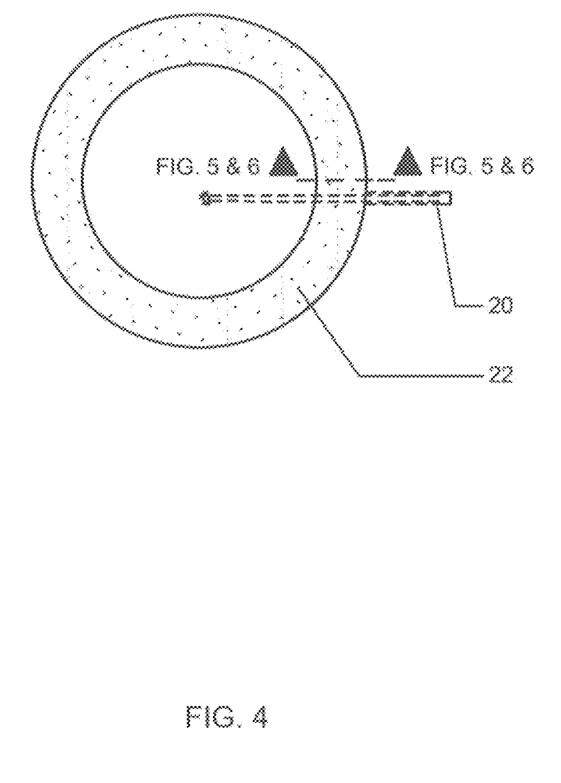
FIG. 4 is a top view of a circular foundation of an invention.

Referring in more detail to a circular foundation 22 as shown in FIG. 3 and FIG. 4, the interior may be left exposed to fertile earth or filled with suitable material to support growth of a plant such that the foundation can act as a base for a planter ring. The structure may be secured to such a circular foundation or any other type of foundation.

Figure 5:
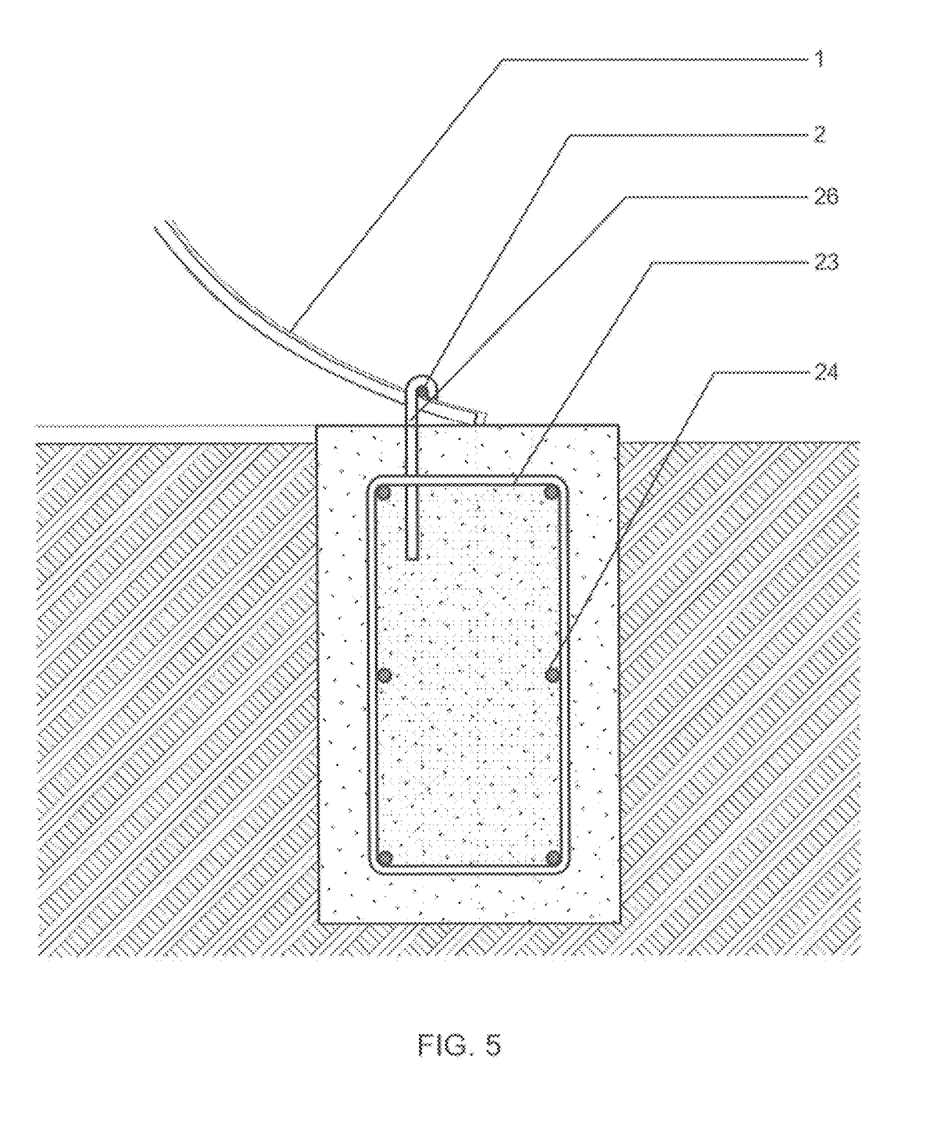
FIG. 5 is a cross-sectional view of a circular foundation as indicated in FIG. 4.
Figure 6:
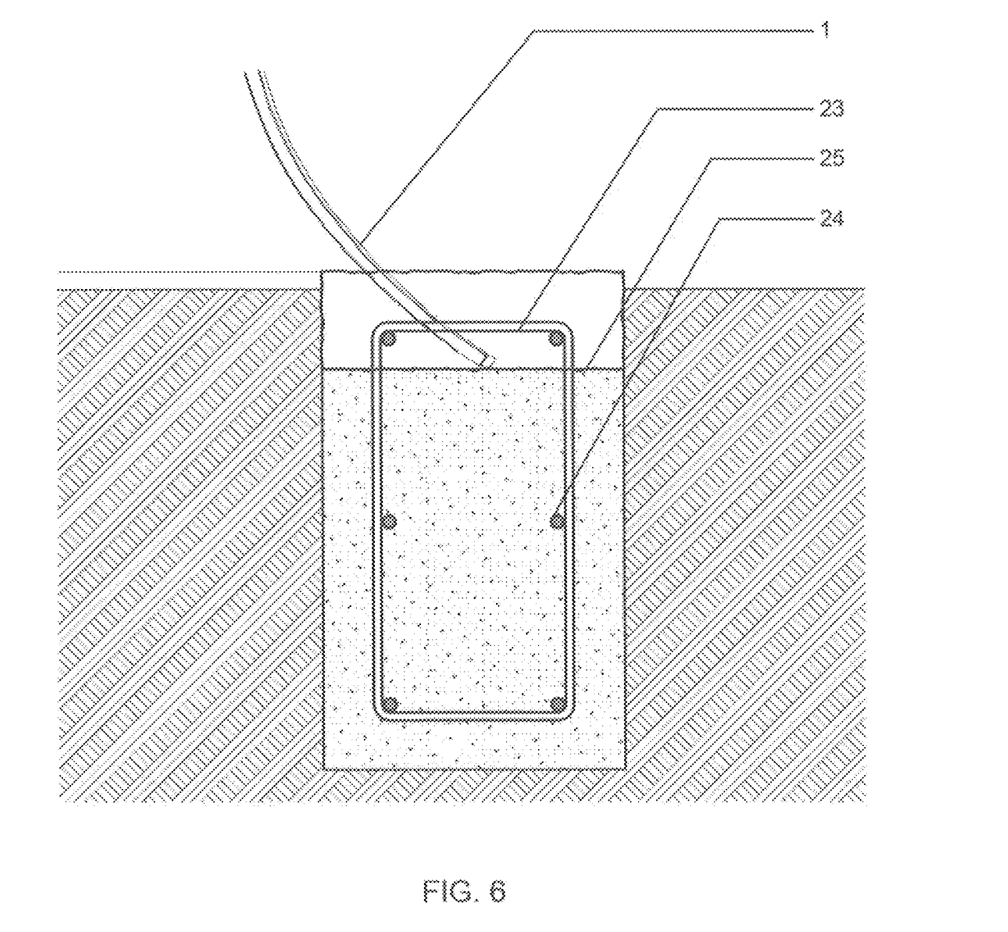
FIG. 6 is a cross-sectional view of and a variation of the embodiment of a circular foundation as indicated in FIG. 4.

A cross section of a circular foundation is illustrated in FIGS. 5 and 6. Hooks 26 as depicted in FIG. 5 may be fastened to concrete using epoxy adhesive or equivalent to secure either the lowest horizontal support elements 2 (FIG. 5) or vertical support elements 1. Alternatively, the structure as shown in FIG. 6 may be integrated directly into a foundation by first creating a partial foundation to a depth 25, allowing adequate drying time and then placing the embodiment on the partial foundation. In this case, concrete or similar material(s) with specified strength may be used to complete the foundation and thus lock and secure the embodiment. Again as previously mentioned an embodiment may integrate a circular bench or planter ring as shown in the perspective drawing of FIG. 7 that is constructed of appropriate materials to provide seating or a soil support with aesthetics and dimensions to meet requirements on the foundation.

Embodiments of the invention have dimensions that can be defined by the lengths and bend characteristics of the vertical support elements. Vertical support elements can be bent by machine or by hand or both to a specified list of angles and to specified radii of curvature that scale with solar module quantity, size, interior void size and solar insolation surface. Environmental conditions, geographic location and other site specific limitations drive the design of the predetermined solar insolation surface that dictate the height, size and number and bends of the vertical support elements. Additionally the dimensions of all elements should be specified to protect modules, components and an interior plant or plants from animals or other dangers, if required.

An embodiment of the invention can vary in the number of vertical support elements and horizontal support elements as mentioned above. Furthermore the above dimensions can be specified for each element or rebar or equivalent structural element to create the support surface for the solar modules and additionally to meet the specific environmental, geographic, energy, duration and energy needs for the specific embodiment of the invention. Specifications of embodiments may be calculated by software protected by copyright or by hand that optimizes output based on environmental, geographical or other considerations.

Referring to the invention in more detail, FIG. 1 shows an embodiment of the invention from the top where rebars or equivalent structural materials 1 and 2 (FIG. 1) are oriented in non-planar but almost flat (planar) orientation to support conventional c-channel or racking rail material 16 (FIG. 1) that secures each solar module 18 (FIG. 1) by spanning the approximate width of the module. The c-channel or racking material is secured to the support structure using appropriate electrical construction hardware or equivalent, preferably stainless steel.

Solar module 18 (FIG. 1) is an AC module (photovoltaic), DC modules (photovoltaic) with microinverters or optimizers, or any other type of solar energy collection module.

An optional fine mesh or greenhouse material may be fixed between the upper surface of the rebars and the solar modules to prevent vegetative plant growth from interfering with solar module insolation. This may follow the solar insolation surface.

Embodiments should be grounded and/or lightning protected using conventional means that comply with NEC or equivalent regulations and/or other safety standards or equivalent.

OPERATION

After the solar plant structure invention is constructed it is commissioned into service complying with NEC and local codes. Internal vegetative plant may require periodic trimming. If specific modules have been donated by individuals their continued output is periodically reported to the donor via the internet or other means as incentive for the further donations perhaps in other needy geographic areas (e.g. a school in Africa).

CONCLUSIONS, RAMIFICATIONS AND SCOPE

A new type of structure for mounting solar modules addresses the problem of solar access in several ways. Firstly, the structure can enclose a living plant and protect it and equipment. This allows improved acceptance and can provide a means for ground mounted solar to be classified as landscape by permitting authorities. This can make a large difference in the amount of area a land owner can use to mount solar modules. Also, the structure can make better use of recently developed solar technology like AC modules, microinverters and optimizers by allowing a solar designer to define a non-planar insolation surface that can be implemented using locally made materials. By allowing a custom non-planar design the solar plant support structure can more closely match loads, lower energy storage costs, energy transmission costs and make better use of limited solar access.

We claim:

1. A solar plant support structure comprising:
seven or more vertical support elements made from long narrow rigid material shaped to provide a predetermined height and support for solar modules mounted on an insolation surface, each of the vertical support elements defines two predetermined bends which provide supports for a solar module at three points approximately on the predefined insolation surface;
wherein one of the predetermined bends is proximal to and provides a more stable connection to the ground, and another of the predetermined bends provides an angle of radially distributed support forming the solar insolation surface;
a plurality of horizontal support elements selected from the group consisting of hoops, helixes, spirals, and arcs;
interconnections between said vertical support elements and horizontal support elements at distributed intervals along a closed area with spacing and strength sufficient to provide mechanical support and structural stability;
wherein an interior void region is formed by said closed area that protects and supports vegetation;
a solar module mounting surface formed by the upper portion of said vertical members and shaped to approximately conform to the solar insolation surface; and
at least one solar module mounted at the three points on the solar module mounting surface.

2. The solar plant support structure of claim 1 further comprising support for an interior vegetative plant wherein said interior void region formed by said vertical support elements provides protection for said vegetative plant.

3. The solar plant support structure of claim 1 with interior equipment wherein said interior void region formed by said vertical support elements provides protection for said interior equipment.

4. The solar plant support structure of claim 1 with the vertical support members formed to conform to said predetermined solar insolation surface with an azimuth and elevation tilt.

5. The solar plant support structure of claim 1 with said vertical support elements made from rebar material.

6. The solar plant support structure of claim 1, further including a planter ring.

7. The solar plant support structure of claim 1, further including shaded seating encircling the support structure.

8. The solar plant support structure of claim 1 with a multitude of the at least one solar module selected from the group consisting of AC module, photovoltaic with microinverter, photovoltaic with optimizer, rigid photovoltaic, flexible photovoltaic and solar thermal are attached to said vertical support elements formed along said solar module mounting surface.

9. The solar plant support structure of claim 8, wherein the at least one solar module is at least seven solar modules mounted radially with more than 13 said vertical support members and more than two said hoops as interconnections.

10. The solar plant support structure of claim 8, wherein the at least one solar module is at least 21 solar modules mounted radially with more than 13 said vertical support members and more than two said hoops as interconnections.

11. The solar plant support structure of claim 8, further comprising an additional solar module mounted over the void region.

12. A method for supporting solar modules along a predetermined solar insolation surface comprising:
a. bending, at least twice, five or more vertical support elements comprising long narrow rigid material to provide stable height and radially distributed support along said predetermined solar insolation surface while encircling a void region;
wherein one of the bends is proximal to and provides a more stable connection to the ground, and another of the bends provides an angle of radially distributed support forming the solar insolation surface;
b. interconnecting said vertical support members to a plurality of horizontal support elements selected from the group consisting of hoops, helixes, spirals, and arcs, at regular intervals such that said vertical members form a void region and provide said radially distributed support along said predetermined solar insolation surface; and
c. mounting at least one solar module at three points to the solar insolation surface formed by the bent upper ends of the vertical support elements.

13. The method of claim 12 wherein said bending of the top portion of said vertical support elements is done so that said vertical support element extends radially outward along said solar isolation surface.

14. The method of claim 12 wherein said interconnecting said vertical support elements with said horizontal support elements by means of welding.

15. The method of claim 12 wherein said vertical support elements are rebar.

* * * * *